United States Patent [19]

Ebreo et al.

[11] 4,231,140
[45] Nov. 4, 1980

[54] KEY CLIP ADAPTED FOR A KEY CASE

[75] Inventors: Mark A. Ebreo, Putnam; Andrew Koches, Old Saybrook, both of Conn.

[73] Assignee: William Prym, Inc., Dayville, Conn.

[21] Appl. No.: 2,461

[22] Filed: Jan. 10, 1979

[51] Int. Cl.² ............................................. A44B 13/02
[52] U.S. Cl. .................................... 24/237; 70/456 B
[58] Field of Search ......................... 24/237, 230.5 W; 70/456 B, 458

[56] References Cited

U.S. PATENT DOCUMENTS

| | | | |
|---|---|---|---|
| 1,553,445 | 9/1925 | Holmes | 70/456 B |
| 1,596,055 | 8/1926 | Lorber | 24/237 X |
| 1,613,760 | 1/1927 | Lorber | 70/456 B |
| 2,720,014 | 10/1955 | Caldwell | 24/237 X |
| 2,812,606 | 11/1957 | Painter | 70/456 B X |

FOREIGN PATENT DOCUMENTS 645606  11/1950  United Kingdom ................... 70/456 B Primary Examiner—Nile C. Byers, Jr.
Attorney, Agent, or Firm—Montague & Ross

[57] ABSTRACT

The present invention relates to key clips adapted for a key case and comprises a vertical section and extending from such vertical section a horizontal section. The vertical section is equipped with an indent or ridge which is disposed spaced apart from the lower end of the vertical section. The end of the horizontal section is bent into a first short straight line section, which, in turn, is further bent into a second short straight line section. The second short straight line section is bent downwardly at its end to form an inverted section which terminates spaced apart slightly above the indent or ridge to operate flexiby in connection with the ridge. The key clips are designed to suspend on the horizontal section two or more keys which can be disposed parallel to each other, thereby, due to the effect of the vertical section combined with the horizontal section, avoiding the drawbacks inherent in the conventional "teardrop" design.

1 Claim, 3 Drawing Figures

U.S. Patent      Nov. 4, 1980      4,231,140
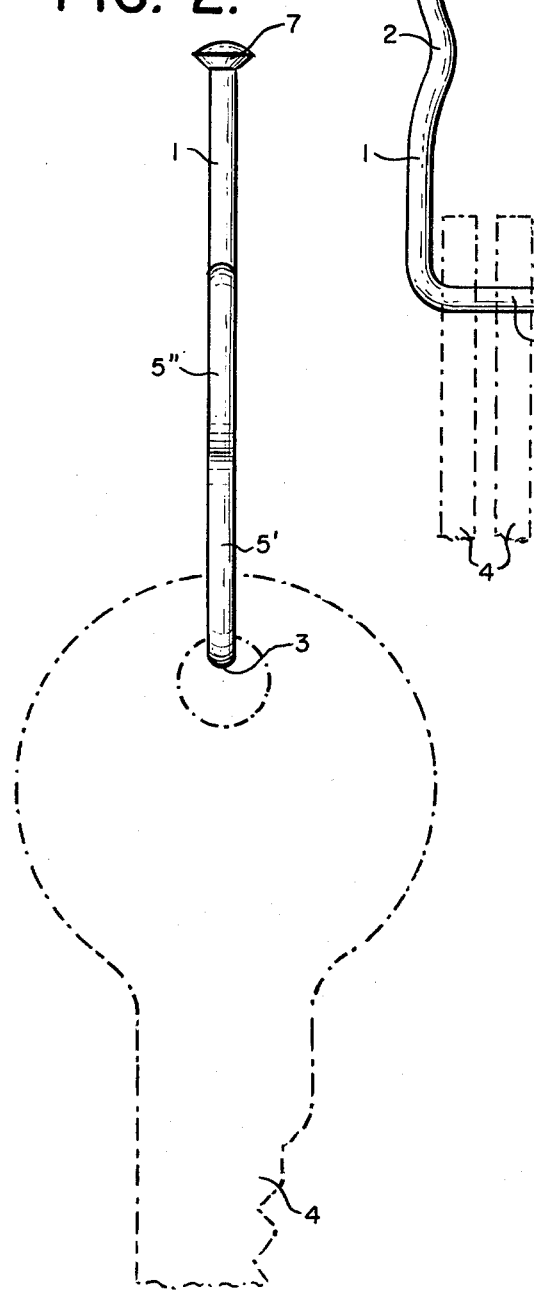
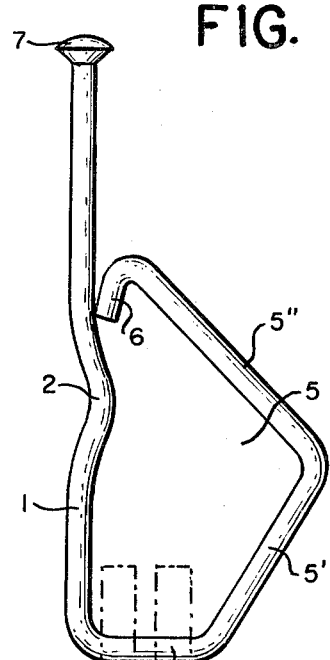
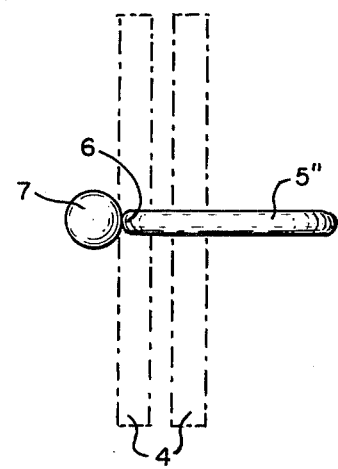

KEY CLIP ADAPTED FOR A KEY CASE

The present invention relates to key clips adapted for a key case.

Key clips, which have been proposed before, have been substantially of a "tear-drop" configuration. These known key clips have draw-backs inherent in their structure.

Key clips designed in accordance with the present invention avoid these draw-backs. It is one object of the present invention to provide key clips which are capable of receiving two or more keys without bunching together. This design also inhibits the keys from working free of the clips which have an opening to suspend or discharge keys in an advantageous manner.

It has been found that the "tear-drop" design does not prevent the keys from easily slipping out of the clips even when the key case itself is closed.

It is another object of the present invention to provide key clips which have a straight-line vertical section which is equipped with an indent or ridge which is disposed intermediate its ends in order to provide a positive lock to prevent involuntary removal of the keys. The indent or ridge, which is positioned directly below a downwardly inverted section, serves as a deflector, thereby prohibiting the keys from moving upwardly through the open end formed by the clip. The upper end of the vertical section has a ball-shaped body (boss) and is designed to operate as a suspension means for the key clips.

It is still another object of the present invention to provide key clips which include a single horizontal section extending from the lower portion of the straight-line vertical section, allowing the keys to be attached and to remain parallel to each other. This brings about an advantage over conventional "tear-drop" or multiple-plane designs, since they do not have a straight horizontal section longer than the width of a key.

It is yet a further object of the present invention to form an open section defined by short straight line sections created by bends provided at the junction of the short straight line sections, the latter sections leading to a superior "set" at the open section, thereby preventing distortion caused by repeated flexing as keys are attached or removed from the clips.

With these and other objects in view which will become apparent in the following detailed description, the present invention will be clearly understood in connection with the accompanying drawing, in which:

FIG. 1 is a front elevation of a key clip designed in accordance with the present invention;

FIG. 2 is an end view of the key clip as shown in FIG. 1; and

FIG. 3 is a top plan view of the key clip.

The key clips, designed in accordance with the present invention, and shown in the accompanying drawing, comprise a straight line vertical section 1 having a boss 7 formed at the upper end thereof and an indent or ridge 2 preferably at about midway of the length of the vertical section 1, the indent or ridge 2 providing a positive lock to prevent involuntary or undesirable removal of the keys 4 suspended from the horizontal section 3, which latter section 3 is formed by bending in a substantially right angle the lower portion of the vertical section 1. The horizontal section 3 has preferably a length of 0.100" and will support at least two keys without bunching the same and retaining the keys 4 in parallel arrangement. The key clips include an open section 5 formed by two short straight line sections 5' and 5" bent to form an obtuse angle. The end of the short straight line section 5" has a downwardly inverted section 6 formed thereto and at an acute angle positioned directly above the indent or ridge 2 to serve as a deflector, thereby preventing keys from moving upwardly through the open end and passing the inverted section 6.

In view of the short straight line sections 5' and 5", the open section 5 is further formed by providing bends at the junction between the horizontal section 3 and the first short straight line section 5' as well as at the junction between the first short straight line section 5' and the second short straight line section 5" to provide a superior "set" to the open section 5. This arrangement prevents distortion caused by repeated flexing as keys are attached or removed from the clips. By providing two short straight line sections 5' and 5", which are angled from the horizontal section 3, greater stability and control of the open end is possible than from a conventional "tear-drop" design.

It has already been pointed out that with the "tear-drop" design, after repeated use of same, the key clip opening becomes enlarged and distorted from the original shape. This happens because of the unbroken line defined by the long vertical leg extending upwards to form the key opening. Without the horizontal section 3, this long continuous arc or elliptical arm must rely only on the tensile strength contained in the parent metal. The stress applied at the key opening will then transmit over the entire arc, or ellipse, also exerting pressure on the single vertical leg. Repeated use will cause metal fatigue of the "tear-drop" shape resulting in the loss of the "set". In time, the opening will become large enough to allow the key or keys to work free of the key clip. By introducing a right angle bend at the lower portion of the vertical section, a firm "set" is established upon which the return portion receives stability and control of the key opening. Additional strength is also achieved by developing the two short straight line sections 5' and 5", having a bend at a point substantially mid-way from the horizontal section 3.

While we have disclosed one embodiment of the present invention, it is to be understood that this embodiment is given by example only and not in a limiting sense, the scope of the present invention being determined by the objects and the claim.

We claim:

1. A bent-wire key clip for a key case comprising:
   a generally straight relatively long first arm having a boss at one end adapted to be received in a key case;
   a straight relatively short second arm extending at a right angle to said first arm at the opposite end thereof and coplanar therewith;
   a straight third arm shorter than said first arm and longer than said second arm and including a first obtuse angle with said second arm;
   a straight fourth arm shorter than said first arm and longer than said second arm and bent at a second obtuse angle to said third arm, said fourth arm approaching said first arm in the region of the center thereof, all of said arms being coplanar, said first arm having an indent bent inward toward said third and fourth arms between said region and said opposite end; and
   a finger bent at an acute angle from said fourth arm toward said indent and resiliently bearing upon said first arm adjacent said indent and between said indent and said boss.

* * * * *